(12) United States Patent
Tsou

(10) Patent No.: US 10,760,710 B2
(45) Date of Patent: Sep. 1, 2020

(54) FLOW CONTROL VALVE HAVING A FLOW DISPLAY DEVICE OBSERVABLE FROM ANY DIRECTION

(71) Applicant: Eric Tsou, Taipei (TW)

(72) Inventor: Eric Tsou, Taipei (TW)

(*) Notice: Subject to any disclaimer, the term of this patent is extended or adjusted under 35 U.S.C. 154(b) by 0 days.

(21) Appl. No.: 16/232,300

(22) Filed: Dec. 26, 2018

(65) Prior Publication Data

US 2019/0331255 A1 Oct. 31, 2019

(30) Foreign Application Priority Data

Apr. 25, 2018 (TW) .............................. 107205383 U

(51) Int. Cl.
*E03B 7/07* (2006.01)
*F16K 37/00* (2006.01)
*F16K 31/50* (2006.01)

(52) U.S. Cl.
CPC .......... *F16K 37/0008* (2013.01); *F16K 31/50* (2013.01); *Y10T 137/8275* (2015.04)

(58) Field of Classification Search
CPC ......... Y10T 137/8225; Y10T 137/8275; F16K 37/0008; F16K 37/0016; F16K 37/0058
USPC ......................................................... 116/277
See application file for complete search history.

(56) References Cited

U.S. PATENT DOCUMENTS

| | | | | |
|---|---|---|---|---|
| 3,802,462 A * | 4/1974 | Trosch | ..................... | F16K 7/126 137/556 |
| 4,235,258 A * | 11/1980 | Uno | ..................... | F16K 37/0008 137/556 |
| 4,258,748 A * | 3/1981 | Guman | ............... | F16K 37/0008 137/553 |
| 4,316,482 A * | 2/1982 | Pearce | .................... | F16K 7/126 137/315.07 |
| 4,446,887 A * | 5/1984 | Redmon | ................. | F16K 47/04 137/556 |
| 4,450,861 A * | 5/1984 | Bouteille | .............. | F15B 11/064 137/493.8 |
| 4,559,970 A * | 12/1985 | Taylor | ..................... | F16K 17/10 137/458 |
| 6,655,316 B2 * | 12/2003 | Kerger | ................ | F16K 17/0413 116/272 |
| 8,678,348 B1 * | 3/2014 | Cassel | ....................... | F16K 1/04 251/223 |
| 2006/0060660 A1 * | 3/2006 | Bruhat | ................. | G05D 23/023 236/96 |
| 2008/0191157 A1 * | 8/2008 | Nguyen | .................. | F16K 31/50 251/145 |
| 2012/0255633 A1 * | 10/2012 | Nguyen | .................. | F16K 31/50 137/551 |
| 2012/0261601 A1 * | 10/2012 | Colby | ....................... | F16K 1/54 251/264 |

(Continued)

*Primary Examiner* — Robert K Arundale
(74) *Attorney, Agent, or Firm* — Wang Law Firm, Inc.

(57) ABSTRACT

A flow control valve includes: a valve body, a valve seat, a valve rod, a flow display device, a transparent cap and a turning knob. The flow display device is installed around a display section of the valve seat, includes a plurality of display straps observable from any direction via the transparent cap in order to determine the instant fluid flow rate regardless of whether the location of the flow control valve in an open and unobstructed space, or many obstacles in the wall, corner, or narrow space. The user can clearly see the flow display device from any angle so as to determine the real-time flow rate without deviation.

12 Claims, 11 Drawing Sheets

(56) References Cited

U.S. PATENT DOCUMENTS

| | | | |
|---|---|---|---|
| 2013/0180608 A1* | 7/2013 | Chang | F16K 37/0008 137/553 |
| 2014/0076418 A1* | 3/2014 | Ibsen | F16K 31/60 137/315.01 |
| 2015/0027544 A1* | 1/2015 | Shemer | F16K 37/0016 137/1 |
| 2015/0075652 A1* | 3/2015 | Bell | F16K 37/0008 137/556 |
| 2015/0247588 A1* | 9/2015 | Matalon | F16K 35/027 251/93 |

\* cited by examiner

FLOW CONTROL VALVE HAVING A FLOW DISPLAY DEVICE OBSERVABLE FROM ANY DIRECTION

CROSS-REFERENCE TO RELATED APPLICATION

This application claims the priority of Taiwanese patent application No. 107205383, filed on Apr. 25, 2018, which is incorporated herewith by reference.

BACKGROUND OF THE INVENTION

1. Field of the Invention

The present invention generally relates to a flow control valve, and more particular to a flow control valve having a flow display device that can be easily observed from any direction.

2. The Prior Arts

A flow control valve is generally installed on many pipelines that transport fluid to control its flow rate. A conventional flow control valve usually includes a valve body, a valve seat, a valve rod, a turning knob and a positioning ring. The valve body defines a flow passage, has two opposite ends for connection with a transportation piping system. The valve seat has a combining section mounted on a top side of the valve body and a locking section having a toothed surface. The valve rod is mounted rotatably in the valve seat, has a coupling portion extending through the locking section of the valve seat and a blocking portion passing through the combining section of the valve seat to extend into the flow passage of the valve body. The turning knob is mounted on the coupling portion of the valve rod for co-rotation therewith such that rotation of the turning knob results in movement of the turning knob relative to the valve seat so as to adjust the enclosing extent of the locking section of the valve seat. The bottom of the turning knob has a plurality of resilient tabs, interior of which are provided with toothed surface. The positioning ring is sleeved around the resilient tabs of the turning knob and is movable between an unlocked position and a locked position.

When the positioning ring is moved to the unlocked position, the resilient tabs of the turning knob turn outward for not being compressed inwardly by the positioning ring relative to the valve seat, thereby disengaging the toothed surface of locking section of the valve seat from the toothed surface of the resilient tabs of the turning knob. At this time, rotation of the turning knob results in axial movement of the valve rod relative to the valve seat and adjusts the extension extent of the blocking portion of the valve rod in the flow passage of the valve body, which in turn, changing the flow rate in the flow passage of the valve body. To be more specific, the closer the turning knob approaches toward the valve body, the further the blocking portion of the valve rod extends into the flow passage of the valve body, the smaller the flow rate of the fluid passing through the flow passage of the valve body becomes. In the similar manner, the farther the turning knob moves away from the valve body, the lesser depth the blocking portion of the valve rod extends into the flow passage of the valve body, the greater the flow rate of the fluid passing through the flow passage of the valve body becomes.

When the positioning ring is moved to the locked position, the resilient tabs of the turning knob are compressed inwardly by the positioning ring relative to the valve seat, where the toothed surface of the locking section of the valve seat meshes with the toothed surface of the resilient tabs of the turning knob, thereby preventing the turning knob from being rotated. At this time, the valve rod is maintained at a still condition relative to the valve seat and the valve body, and hence permits a constant flow rate of fluid passing through the flow passage in the valve body.

In industrial processes, a slightly different (slightly large or slightly less) of the flow rate of fluids, such as liquids or gases, may cause a huge impact to the fluid transportation system. The conventional flow control valve does not have any component to display the instantaneous flow rate. The user can only estimate the flow rate from the separated distance between the turning knob and the valve body by experience. It is difficult to accurately determine the actual flow rate, and the user is often put in a wrong situation to judge the error and hence causing a great loss.

Regarding the above problem, FIG. 11 shows a currently market available flow control valve 100, which includes a valve seat 102 having a display section installed on the locking section 1022 thereof so as to be located in the turning knob 106. A flow display device 104 is installed around the display section of the valve seat 102, and includes a plurality of display straps 1041-1043 arranged sequentially from a top to bottom manner. Each display strap 1041-1043 displays a specific depth of the block portion of the valve rod within the flow passage of the valve body and represents a specific flow rate passing through the flow passage of the valve body. The turning knob 106 has two windows 1061 formed at two symmetric sides in the width direction thereof each is provided with an indicating mark 1062. Rotation of the turning knob 106 relative to the locking section 1022 of the valve seat 102 results in changing the display straps 1041-1043 which are exposed by the two windows 1061 at any time such that the user can refer to the indicating mark 1062 at a specific display strap 1042 of each window 1061 and accurately determines the instantaneous flow rate of fluid through the flow passage.

However, the viewing angle provided by the two windows 1061 is very limited. In case the position of the conventional flow control valve 100 is installed close to a wall, a corner or narrow space, and the like, there are many obstacles, and usually only the front side can be seen by the user while the left and right sides and the back are affected by the surrounding environment and cannot be seen by the user. In some cases, the user knows that the optimal flow rate must be below the state in which the indicating mark 1062 of the window 1061 is aligned with a certain display strap 1042, and the indicating mark 1062 of the two windows 1061 is aligned with a certain display strap 1042. When the two windows 1061 are rotated by the turning knob 106 to the left and right sides of the flow control valve 100, the user can not see any window 1061 at all, not to mention seeing the flow display device 104 through one of the windows 1061. At this time, the user can only see the front side of the flow control valve 100 (that is, the side of the turning knob 106 without the window 1061). The user may conceive the indicating mark 1062 of the window 1061 may be aligned with a certain display strap 1042, but he cannot 100% determine whether the indicating mark 1062 of the window 1061 is exactly aligned with a certain display strap 1042 as it should be. An important aspect to note is that in industrial processes, if there is a slight deviation (slightly more or slightly less) in the flow rate of fluids, the user may judge mistakenly consider that the indicating mark 1062 of the window 1061 is aligned with a certain display strap 1042, but in fact there is already errors or deviations without knowing in great losses.

Moreover, if the flow display device 104 of the conventional flow control valve is made from a material (for example, a sticker) that can be easily damaged due to moisture, wetness, humidity, dust or other reasons, the flow display device 104 is not visible clearly through the window 1061, thereby causing inconvenience to the users.

SUMMARY OF THE INVENTION

A primary objective of the present invention is to provide a flow control valve, which has a flow display device that can be observed and/or seen from any direction, regardless of whether the installed position is in an open and unobstructed space, or there are many obstacles in the wall, corner, or narrow space, the user can clearly see the flow display device from any angle, and accurately determines the instantaneous flow rate without deviation.

Another objective of the present invention is to provide a flow control valve, which has a flow display device that can be observed and/or seen from any direction, and in which the flow display device cannot be damaged due to external phenomenon, like moisture, wetness, humidity or dust, such that the user can see the follow rate easily.

Yet another objective of the present invention is to provide a flow control valve, which has a flow display device that can be observed and/or seen from any direction and which includes a transparent cap having two opposite smooth sections to facilitate viewing of the fluid flowing status from left and right direction by the user. The flow control valve of the present invention further includes a turning knob having a plurality of resilient tabs provided with toothed surfaces to permit meshing with toothed surface of the transparent cap to facilitate simultaneous turning of the turning knob together with the transparent cap.

In order to achieve the above-mentioned objective, the present invention provides a flow control valve having a flow display device observable from any direction, includes: a valve body; a valve seat; a valve rod; a flow display device; a transparent cap; and a turning knob.

The valve body defines a flow passage, has two opposite ends for connecting with a piping system.

The valve seat includes a combining section installed on a top side of the valve body, an insert section and a display section located between the combining and insert sections. The valve seat defines an axial hole in communication with the flow passage of the valve body.

The valve rod is disposed rotatably within the axial hole in the valve seat, has a coupling portion extending through the insert section of the valve seat and a blocking portion passing through the combining section of the valve seat to extend into the flow passage of the valve body.

The flow display device is installed around the display section of the valve seat, includes a plurality of display straps arranged sequentially from top to bottom and each displaying a specific depth of the block portion of the valve rod within the flow passage of the valve body and representing a specific flow rate passing through the flow passage of the valve body, wherein, the higher the display straps represents the smaller extension depth of the blocking portion of the valve rod within the flow passage of the valve body, the larger fluid flow rate through the flow passage in the valve body becomes and wherein, the lower the display straps represents the bigger extension depth of the blocking portion of the valve rod within the flow passage of the valve body, the smaller fluid flow rate through the flow passage in the valve body becomes.

The transparent cap is mounted on the insert section of the valve seat in such a manner to enclose the display section of the valve seat and the flow display device.

The turning knob is attached to the coupling portion of the valve rod for co-rotating around the valve seat in order to adjust an extension depth of the blocking portion of the valve rod within the flow passage of the valve body, which in turn, simultaneously causes idle rotation of the turning knob relative to the transparent cap and adjusting an enclosing extent of the turning knob relative to the transparent cap such that a portion of the transparent cap is exposed from the turning knob to display entire at least one of the display straps of the flow display device, wherein the at least one of the display straps represents an extension depth of the blocking portion of the valve rod within the flow passage of the valve body and corresponding fluid flow rate through the flow passage in the valve body and wherein the topmost one of the display straps exposed from the transparent cap represents the extension depth of the blocking portion of the valve rod within the flow passage of the valve body and the corresponding fluid flow rate through the flow passage in the valve body.

Preferably, the flow control valve of the present invention further includes a positioning ring sleeved around the turning knob and movable between an unlocked position, where the turning knob disengages from the transparent cap such that the turning knob and the valve rod can be rotated arbitrarily relative to the valve seat and causes an axial movement of the valve rod within the axial hole of the valve seat, and a locked position, where the turning knob engages with the transparent cap such that the valve rod is prevented from rotation relative to the valve seat and is prevented from moving axially within the axial hole of the valve seat.

Preferably, the transparent cap has an external surface including two symmetric toothed sections and another two symmetric smooth sections. A bottom of the turning knob has a plurality of resilient tabs, interior of which are provided with toothed sections while the positioning ring is sleeved around the resilient tabs of the turning knob such that when the positioning ring is moved to the unlocked position, the resilient tabs of the turning knob are not inwardly compressed by the positioning ring relative to the transparent cap, the resilient tabs of the turning knob turn outward so as to disengage the toothed sections of the resilient tabs of the turning knob from the toothed sections of the transparent cap, and when the positioning ring is moved to the locked position, the resilient tabs of the turning knob are compressed inwardly by the positioning ring relative to the transparent cap so as to mesh the toothed sections of some of the resilient tabs of the turning knob with the toothed sections of the transparent cap.

Preferably, the valve body has two parallel external sides extending in a longitudinal length thereof and two opposite ends transverse to the longitudinal thereof such that after assembly the two symmetric smooth sections of the transparent cap are located at the same side with the parallel external sides of the valve body respectively in order to facilitate viewing of the flow display device while the toothed sections of the transparent cap are located at the same side with said opposite ends of the valve body respectively in order to facilitate meshing between the toothed sections of the resilient tabs of the turning knob and the transparent cap.

Preferably, the valve body further has a mounting seat integrally formed at the top side of the valve body. The mounting seat has a threaded hole. The combining section of the valve seat has a threaded portion for coupling with the threaded hole in the mounting seat and a seating flange such that the insert section and the display section of the valve seat are located above the seating flange, wherein, the display section of the valve seat defines an outer diameter smaller than an outer diameter of the seating flange while the insert section of the valve seat defines an outer diameter smaller than the outer diameter of the seating flange, but larger than the outer diameter of the display section of the valve seat, the transparent cap being seated on the seating flange and defining an inner diameter equivalent to the outer diameter of the insert section of the valve seat.

Preferably, the plurality of display straps is provided with straps of different colors.

Preferably, the turning knob is formed with a mounting hole formed with toothed surface. The transparent cap has a top end formed with a through hole. The coupling portion of the valve rod has an external toothed surface extending through the hole in the transparent cap for meshing with the toothed surface in the turning knob for co-rotation therewith.

Some advantages of the present invention resides in that the user can see the display straps of the flow display device through the transparent cap from any direction so as to judge the instantaneous flow rate of fluid passing through the flow passage of the valve body. Therefore, regardless of whether the installed position of the flow control valve of the present invention is in an open and unobstructed space, or there are many obstacles in the wall, corner, or narrow space, the user can clearly see the flow display device from any angle so as to accurately determine the real-time flow rate without deviation. Furthermore, in case the flow display device is made of a material (for example, a sticker) that can be easily damaged due to moisture, wetness, humidity or dust, the flow display device is protected such that the user can see the follow rate easily. In addition, the symmetric smooth sections of the transparent cap are relatively smooth, so that the user can clearly see the flow display condition directly from the front side of the flow control valve of the present invention while the toothed sections of the transparent cap provide meshing with the toothed sections of the resilient tabs of the turning knob. In short, the user sees the fluid flow rate or status of fluid flow from the left and right sides of the flow control valve of the present invention.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
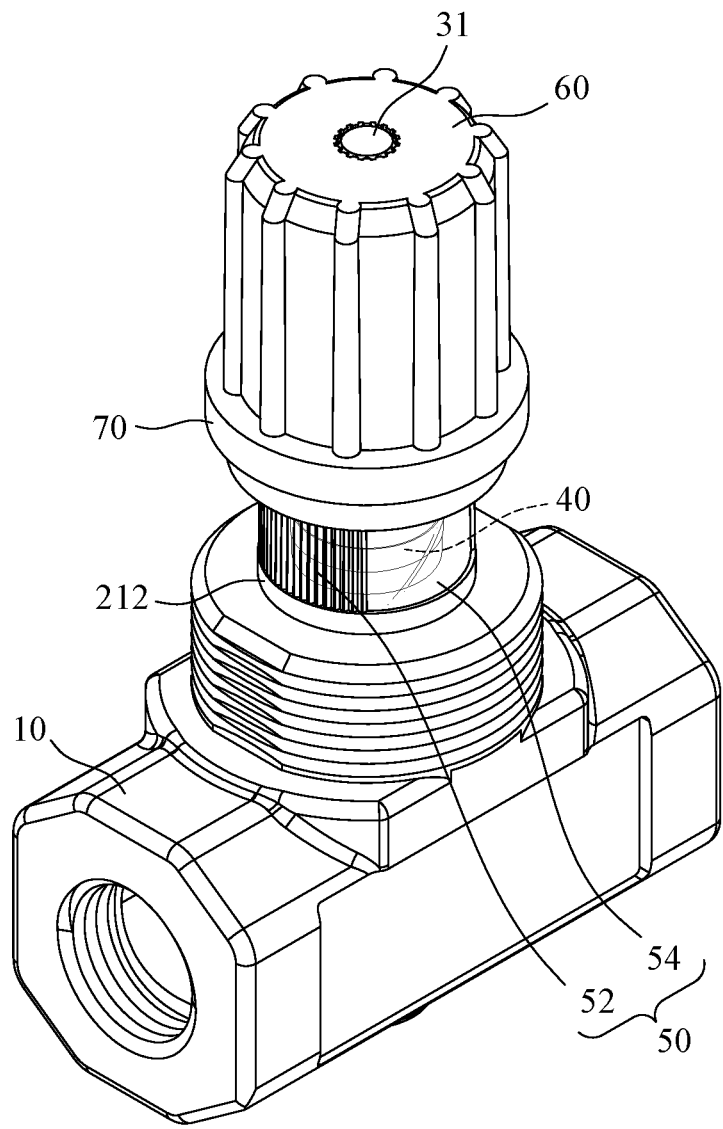
FIG. 1 is a perspective view showing a flow control valve having a flow display device observable from any direction according to the present invention.
Figure 2:
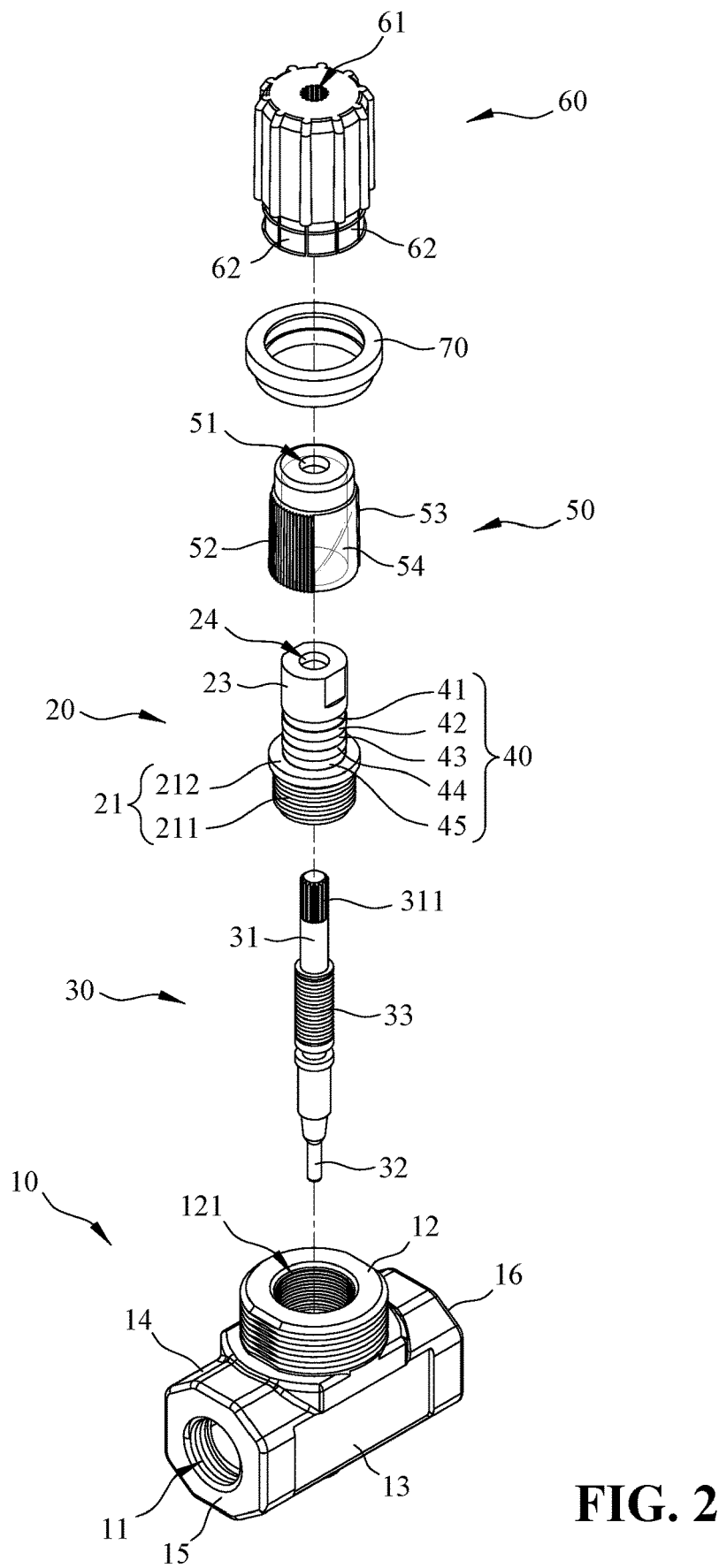
FIG. 2 is an exploded view showing the flow control valve having the flow display device observable from any direction according to the present invention.
Figure 3:
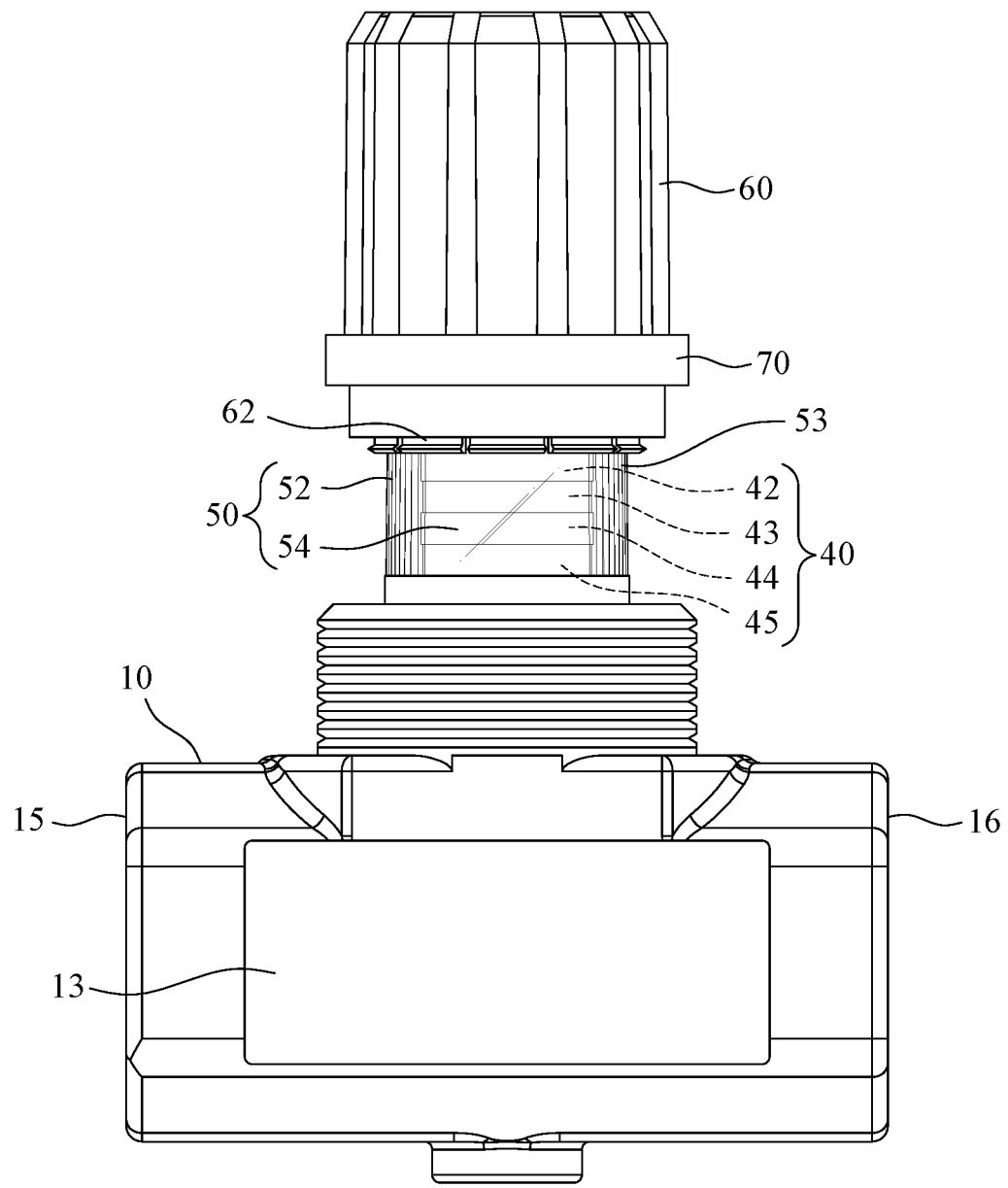
FIG. 3 is a perspective front view showing the flow control valve having the flow display device observable from any direction according to the present invention.
Figure 4:
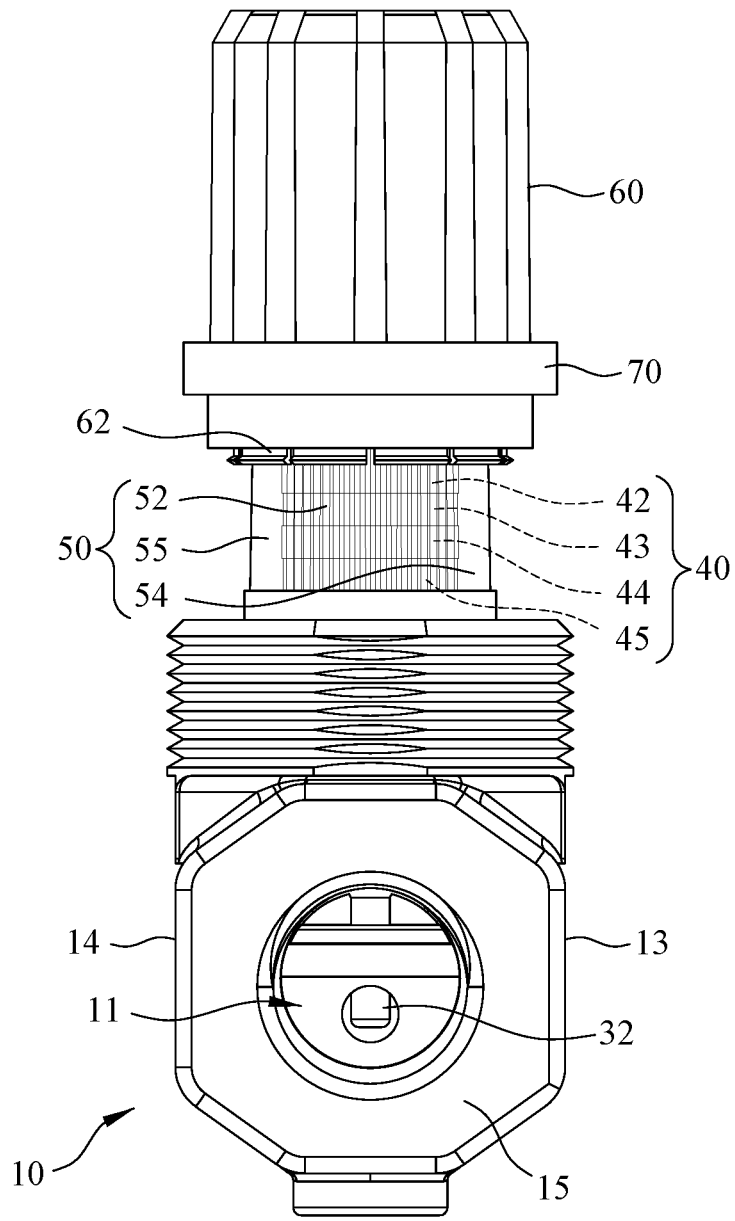
FIG. 4 is a perspective lateral side view showing the flow control valve having the flow display device observable from any direction according to the present invention.
Figure 5:
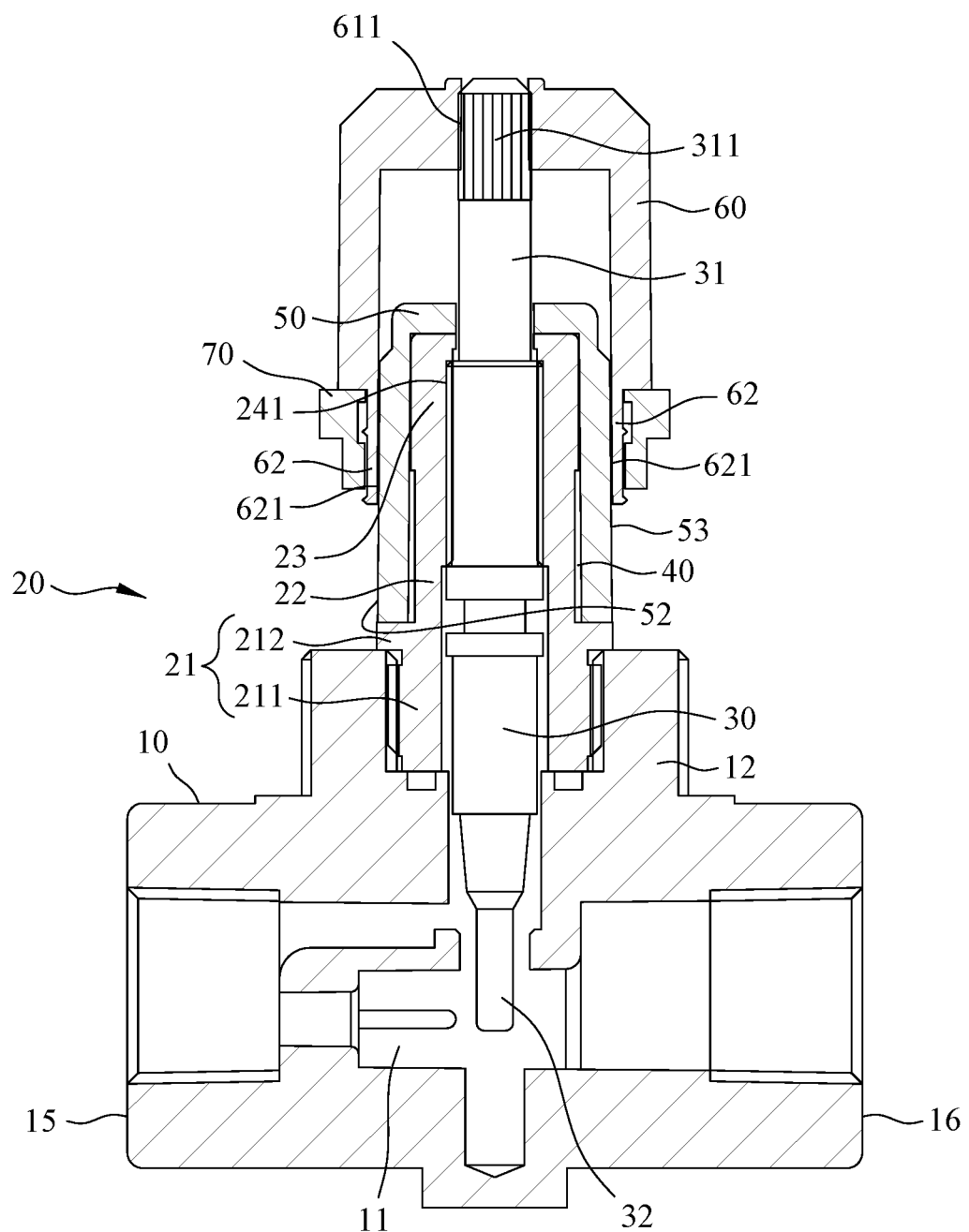
FIG. 5 is a cross-sectional view showing the flow control valve having the flow display device observable from any direction according to the present invention.

Referring to FIGS. 1-5, wherein, FIG. 1 is a perspective view showing a flow control valve having a flow display device observable from any direction according to the present invention; FIG. 2 is an exploded view showing the flow control valve having the flow display device observable from any direction according to the present invention; FIG. 3 is a perspective front view showing the flow control valve having the flow display device observable from any direction according to the present invention; FIG. 4 is a perspective lateral side view showing the flow control valve having the flow display device observable from any direction according to the present invention; and FIG. 5 is a cross-sectional view showing the flow control valve having the flow display device observable from any direction according to the present invention. The flow control valve having a flow display device observable from any direction of the present invention and including: a valve body 10, a valve seat 20, a valve rod 30, a flow display device 40, a transparent cap 50, and a turning knob 60.

The valve body 10 defines a flow passage 11, has two opposite ends for connecting with a piping system (not shown). The valve body 10 further has a mounting seat 12 integrally formed at a top side thereof. The mounting seat 12 has a threaded hole 121. The valve body 10 has two parallel external sides 13, 14 extending in a longitudinal length thereof and two opposite ends 15, 16 transverse to the longitudinal thereof, the purpose of which will be described later in the following paragraphs.

The valve seat 20 includes a combining section 21 installed on a top side of the valve body 10, an insert section 23 and a display section 22 located between the combining and insert sections 21, 23. The valve seat 20 defines an axial hole 24 in communication with the flow passage 11 of the valve body 10. To be more specific, the combining section 21 of the valve seat 20 has a threaded portion 211 for coupling with the threaded hole 121 in the mounting seat 12 and a seating flange 212 such that the insert section 23 and the display section 22 of the valve seat 20 are located above the seating flange 212, wherein, the display section 22 of the valve seat 20 defines an outer diameter smaller than an outer diameter of the seating flange 212 while the insert section 23 of the valve seat 20 defines an outer diameter smaller than the outer diameter of the seating flange 212, but larger than the outer diameter of the display section 22 of the valve seat 20.

The valve rod 30 is disposed rotatably within the axial hole 24 in the valve seat 20, has a coupling portion 31 extending through the insert section 23 of the valve seat 20 and a blocking portion 32 passing through the combining section 21 of the valve seat 20 to extend into the flow passage 11 of the valve body 10. To be more specific, the axial hole 24 of the valve seat 20 is formed with a threaded portion 241 (as best shown in FIG. 5) for threadedly coupled with a middle threaded portion 33 of the valve rod 30, thereby maintaining and permitting rotation of the valve rod 30 relative to the valve seat 20.

The flow display device 40 is installed around the display section 22 of the valve seat 20, includes a plurality of display straps 41-45 arranged sequentially from top to bottom and each displaying a specific extending depth of the block portion 32 of the valve rod 30 within the flow passage 11 of the valve body 10 and representing a specific flow rate passing through the flow passage 11 of the valve body 10, wherein, the higher the display straps 41-45 represents the smaller extension depth of the blocking portion 32 of the valve rod 30 within the flow passage 11 of the valve body 10, the larger fluid flow rate through the flow passage 11 in the valve body 10 becomes and wherein, the lower the display straps 41-45 represents the bigger extension depth of the blocking portion 32 of the valve rod 30 within the flow passage 11 of the valve body 10, the smaller fluid flow rate through the flow passage 11 in the valve body 10 becomes. To be more specific, as best shown in FIG. 2, the outer peripheral surface of the flow display device 40 is provided with five endless display straps 41-45, which are sequentially defined from the top to the bottom as the endless display strap 41, the endless display strap 42, the endless display strap 43, the endless display strap 44 and the endless display strap 45 representing the first depth, the second depth, the third depth, the fourth depth, and the fifth depth of the blocking portion 32 of the valve rod 30 extending into the flow passage 11 of the valve body 10, respectively, thereby representing the flow of fluid through the valve body 10, the first flow rate, the second flow rate, the third flow rate, the fourth flow rate, and the fifth flow rate of the flow passage 11 in the valve body 10. The first depth is the shallowest, so the first flow rate is the largest. The second depth is between the first depth and the third depth, so the second flow rate is between the first flow rate and the third flow rate. The third depth is between the second depth and the fourth depth, so the third flow rate is between the second flow rate and the fourth flow rate. The fourth depth is between the third depth and the fifth depth, so the fourth flow rate is between the third flow rate and the fifth flow rate. The fifth depth is the deepest, so the fifth flow rate is the smallest. In one embodiment of the present invention, each of the endless display straps 41-45 has a color, and the colors of the endless display straps 41-45 are different from one another. The user can immediately determine the specific flow rate of the fluid represented by each of the endless display straps 41 to 45 through the flow passage 11 of the valve body 10 from the difference in colors. Of course, any means that allows the user to immediately determine the specific flow rate of the fluid represented by each of the endless display straps 41-45 through the flow passage 11 of the valve body 10 is covered by the scope of the present invention.

The transparent cap 50 is mounted on the insert section 23 of the valve seat 20 in such a manner to enclose the display section 22 of the valve seat 20 and the flow display device 40. To be more specific, the transparent cap 50 has a top end formed with a through hole 51. The transparent cap 50 is seated on the seating flange 212 and defines an inner diameter equivalent to an outer diameter of the insert section 23 of the valve seat 20.

The turning knob 60 is attached to the coupling portion 31 of the valve rod 30 for co-rotating around the valve seat 20 in order to adjust an extension depth of the blocking portion 32 of the valve rod 30 within the flow passage 11 of the valve body 10, which in turn, simultaneously causes idle rotation of the turning knob 60 relative to the transparent cap 50 and adjusts an enclosing extent of the turning knob 60 relative to the transparent cap 50 such that a portion of the transparent cap 50 is exposed from the turning knob 60 to display entire at least one of the display straps 41-45 of the flow display device 40, wherein the at least one of the display straps 41 represents an extension depth of the blocking portion 32 of the valve rod 30 within the flow passage 11 of the valve body 10 and corresponding fluid flow rate through the flow passage 11 in the valve body 10 and wherein the topmost one of the display straps 41 exposed from the transparent cap 50 represents the extension depth of the blocking portion 32 of the valve rod 30 within the flow passage 11 of the valve body 10 and the corresponding fluid flow rate through the flow passage 11 in the valve body 10. Preferably, the turning knob 60 is formed with a mounting hole 61 formed with toothed surface 611. The coupling portion 31 of the valve rod 30 has an external toothed surface 311 extending through the hole 51 in the transparent cap 50 for meshing with the toothed surface 611 in the turning knob 60 for co-rotation therewith.

Note that before the fluid flow through the flow passage 11 of the valve body 10 is adjusted, the user can determine the instantaneous flow rate by the above method. Referring to FIGS. 3 to 5 as an example, the turning knob 60 covers the top of the transparent cap 50 until a portion of the transparent cap 50 corresponding to the endless display strap 41. In other words, the turning knob 60 does not cover the portion of the transparent cap 50 corresponding to the endless display straps 4245. Therefore, the transparent cap 50 can show or reveal the entire of the endless display straps 42-45 such that the uppermost endless display straps 42-45 of the flow display device 40 exposed by the transparent cap 50 is an endless display strap 42. The instantaneous depth of the blocking portion 32 of the valve rod 30 extending into the flow passage 11 of the valve body 10 is at a second depth and hence the instantaneous fluid flow through the flow passage 11 of the valve body 10 is the second flow rate.

Figure 7:
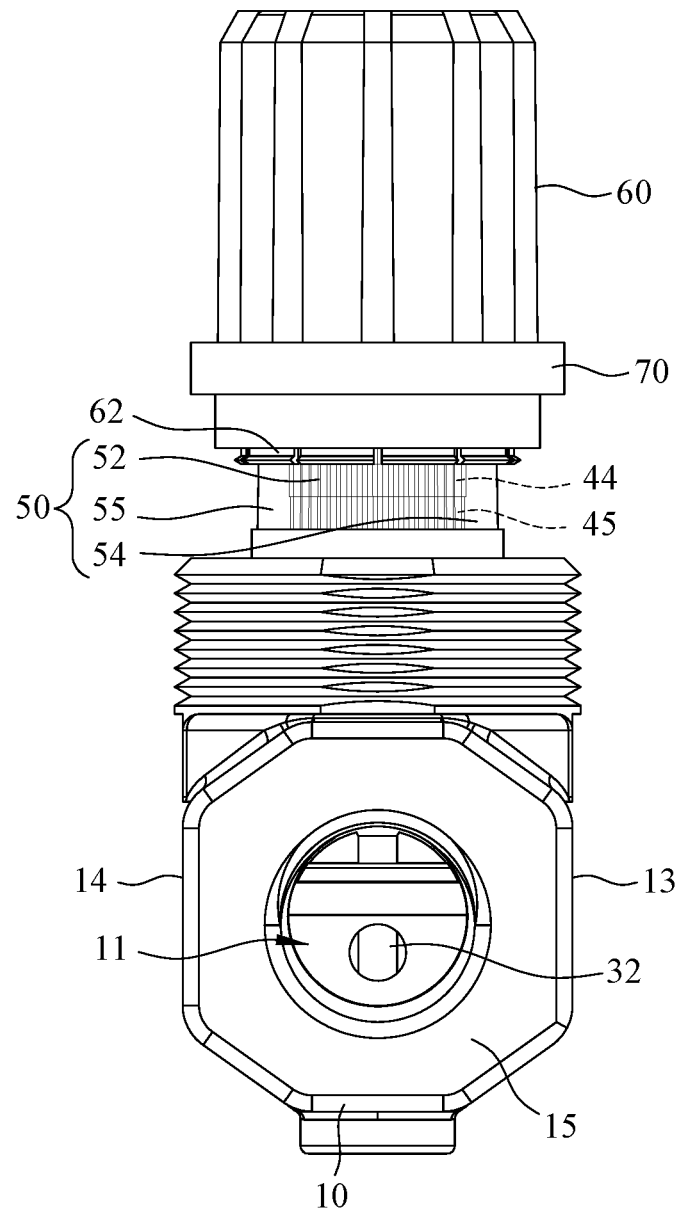
FIG. 7 is a lateral side view the flow control valve according to the present invention showing the flow control valve adjusting fluid flow rate and the positioning ring employed therein is moved to an unlocked position.
Figure 8:
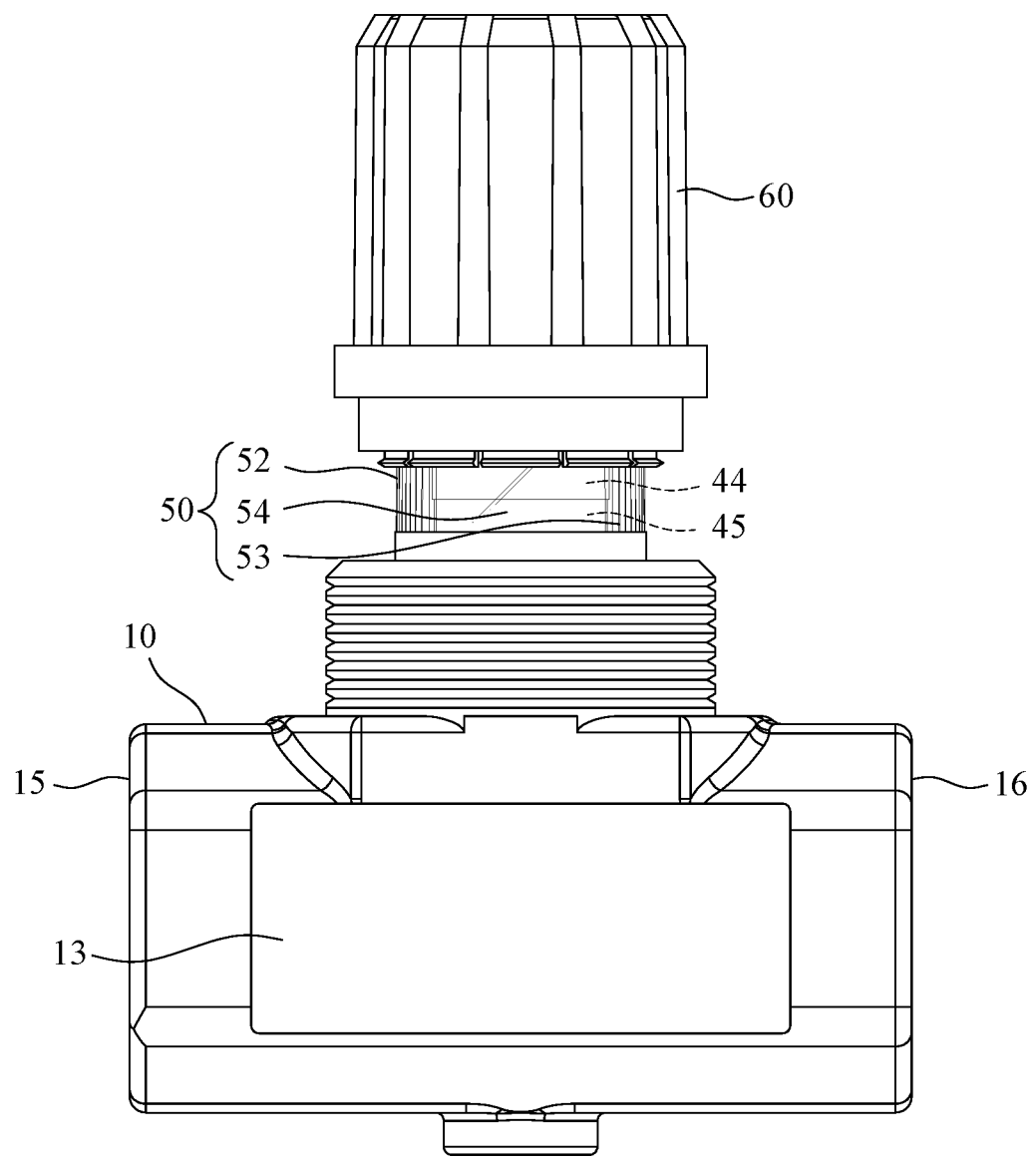
FIG. 8 is a front view the flow control valve according to the present invention showing the flow control valve adjusting fluid flow rate and the positioning ring employed therein is moved to the unlocked position.
Figure 9:
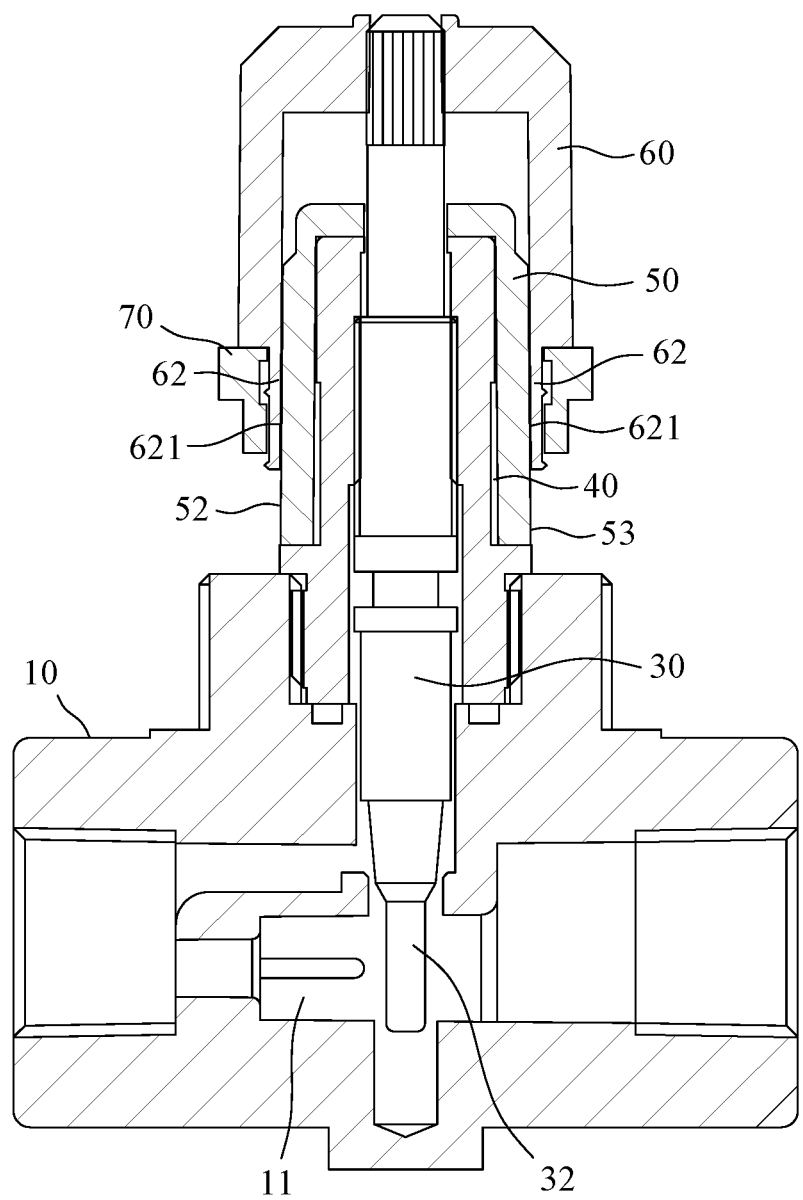
FIG. 9 is a cross-sectional view the flow control valve according to the present invention showing the flow control valve adjusting fluid flow rate and the positioning ring employed therein is moved to the unlocked position.

Referring to FIGS. 7-9, wherein FIG. 7 is a lateral side view the flow control valve according to the present invention showing the flow control valve adjusting fluid flow rate and the positioning ring employed therein is moved to an unlocked position; FIG. 8 is a front view the flow control valve according to the present invention showing the flow control valve adjusting fluid flow rate and the positioning ring employed therein is moved to the unlocked position; and FIG. 9 is a cross-sectional view the flow control valve according to the present invention showing the flow control valve adjusting fluid flow rate and the positioning ring employed therein is moved to the unlocked position. As shown, when the user wants to adjust the flow rate of the fluid through the flow passage 11 of the valve body 10 to the fourth flow rate, all he needs to do is manually rotate the turning knob 60, and the turning knob 60 drives the valve rod 30 to rotate about valve seat 20 inside of the flow passage 11 of the valve body 10 until the turning knob 60 covers the portion of the transparent cap 50 corresponding to the endless display strap 43. At this time, the turning knob 60 does not cover the portion of the transparent cap 50 corresponding to the endless display straps 44 and 45. Therefore, the transparent cap 50 shows the entire endless display straps 44 and 45. The uppermost endless display strap of the flow display device 40 exposed by the transparent cap 50 is the endless display strap 44, and the instantaneous depth of the blocking portion 32 of the valve rod 30 extending into the flow passage 10 of the valve body 10 is the fourth depth, and the instantaneous fluid flow of through the flow passage 11 of the valve body 10 is the fourth flow rate The flow control valve of the present invention can provide a state in which the user can observe the endless display straps 41 to 45 of the flow display device 40 from any direction through the transparent cap 50, thereby judging the instantaneous fluid flow through the flow passage 11 of the valve body 10. Therefore, regardless of whether the installed position of the flow control valve of the present invention is in an open and unobstructed space, or there are many obstacles in the wall, corner, or narrow space, the user can clearly see the flow display device from any angle and can accurately determine the real-time flow rate without any deviation.

In the event that the flow display device 40 is made from a material (for example, a sticker) that can be easily damaged due to moisture, wetness, humidity or dust, the transparent cap 50 can prevent the flow display device 40 from being damaged such that the user can see the flow rate easily and clearly.

Referring again to FIGS. 1-6, the flow control valve of the present invention further includes a positioning ring 70 sleeved around the turning knob 60 and movable between an unlocked position, where the turning knob 60 disengages from the transparent cap 50, as best shown in FIG. 5, such that the turning knob 60 and the valve rod 30 can be rotated arbitrarily relative to the valve seat 20 and causes an axial movement of the valve rod 30 within the axial hole 24 of the valve seat 20, and a locked position, where the turning knob 60 engages with the transparent cap 50 such that the valve rod 30 is prevented from rotation relative to the valve seat 20 and is prevented from moving axially within the axial hole 24 of the valve seat 20, as best shown in FIG. 6.

Figure 6:
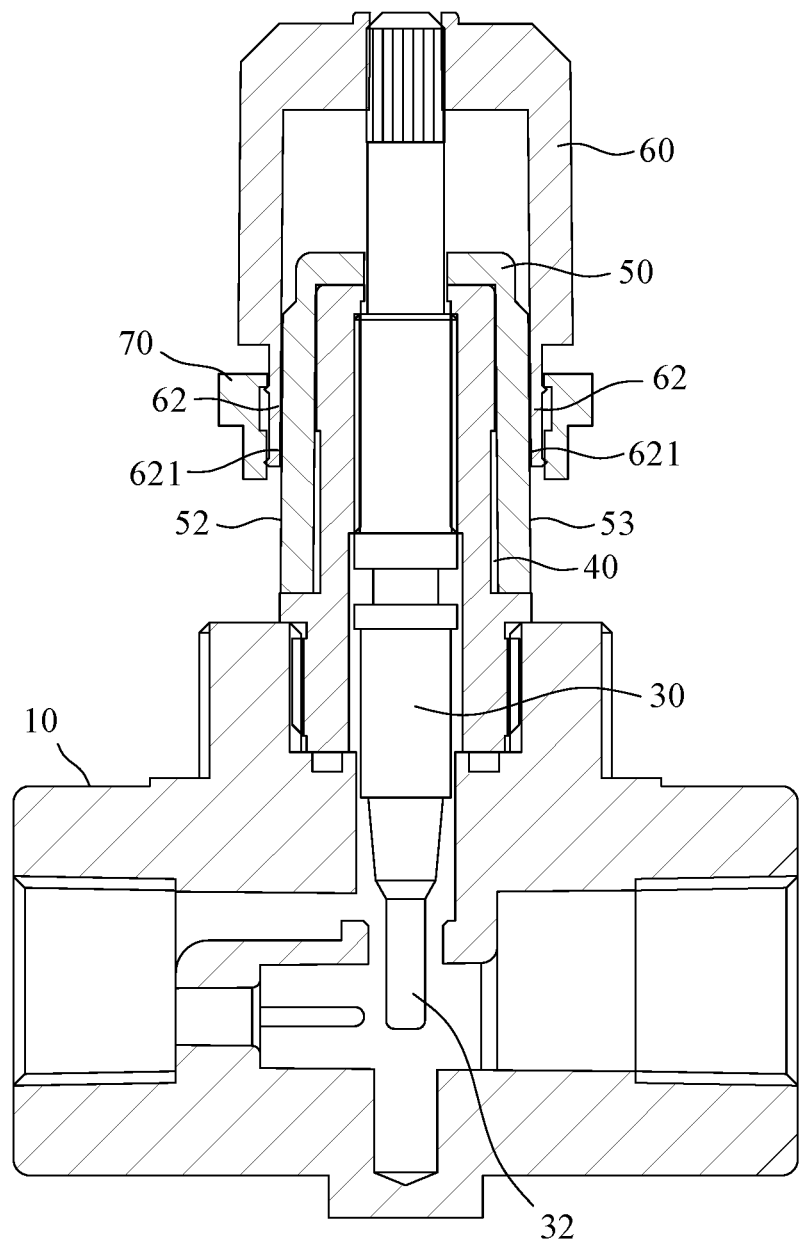
FIG. 6 is a cross-sectional view the flow control valve according to the present invention showing a positioning ring employed therein is moved to a locked position.

To be more specific, the transparent cap 50 has an external surface including two symmetric toothed sections 52, 53 and another two symmetric smooth sections 54, 55. The bottom of the turning knob 60 has a plurality of resilient tabs 62, interior of which are provided with toothed sections 621 while the positioning ring 70 is sleeved around the resilient tabs 62 of the turning knob 60 such that when the positioning ring 70 is moved to the unlocked position, as shown in FIG. 5, the resilient tabs 62 of the turning knob 60 are not inwardly compressed by the positioning ring 70 relative to the transparent cap 50, the resilient tabs 62 of the turning knob 60 turn outward so as to disengage the toothed sections 621 of the resilient tabs 62 of the turning knob 60 from the toothed sections 52, 53 of the transparent cap 50, and when the positioning ring 70 is moved to the locked position, the resilient tabs 62 of the turning knob 60 are compressed inwardly by the positioning ring 70 relative to the transparent cap 50 so as to mesh the toothed sections 621 of some of resilient tabs 62 of the turning knob 60 with the toothed sections 52, 53 of the transparent cap 50, as best shown in FIG. 6.

As shown in FIGS. 7-9, after adjusting operation of the flow rate of the fluid through the flow passage 11 of the valve body 10 to the fourth flow rate and before the positioning ring 70 is moved to the locked position, the turning knob 60 can be rotated arbitrarily relative the transparent cap 50 and so does the valve rod 30.

Figure 10:
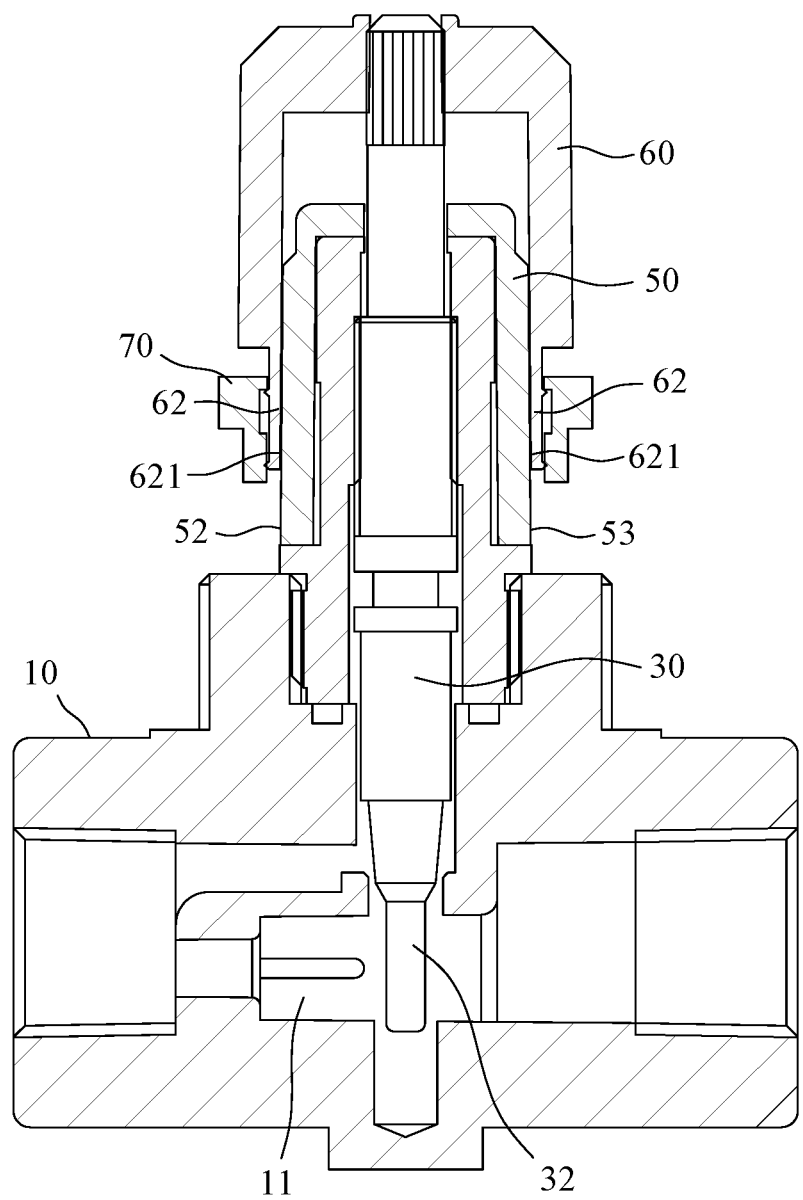
FIG. 10 is a cross-sectional view the flow control valve according to the present invention showing the flow control valve adjusting fluid flow rate and the positioning ring employed therein is moved to the locked position.
Figure 11:
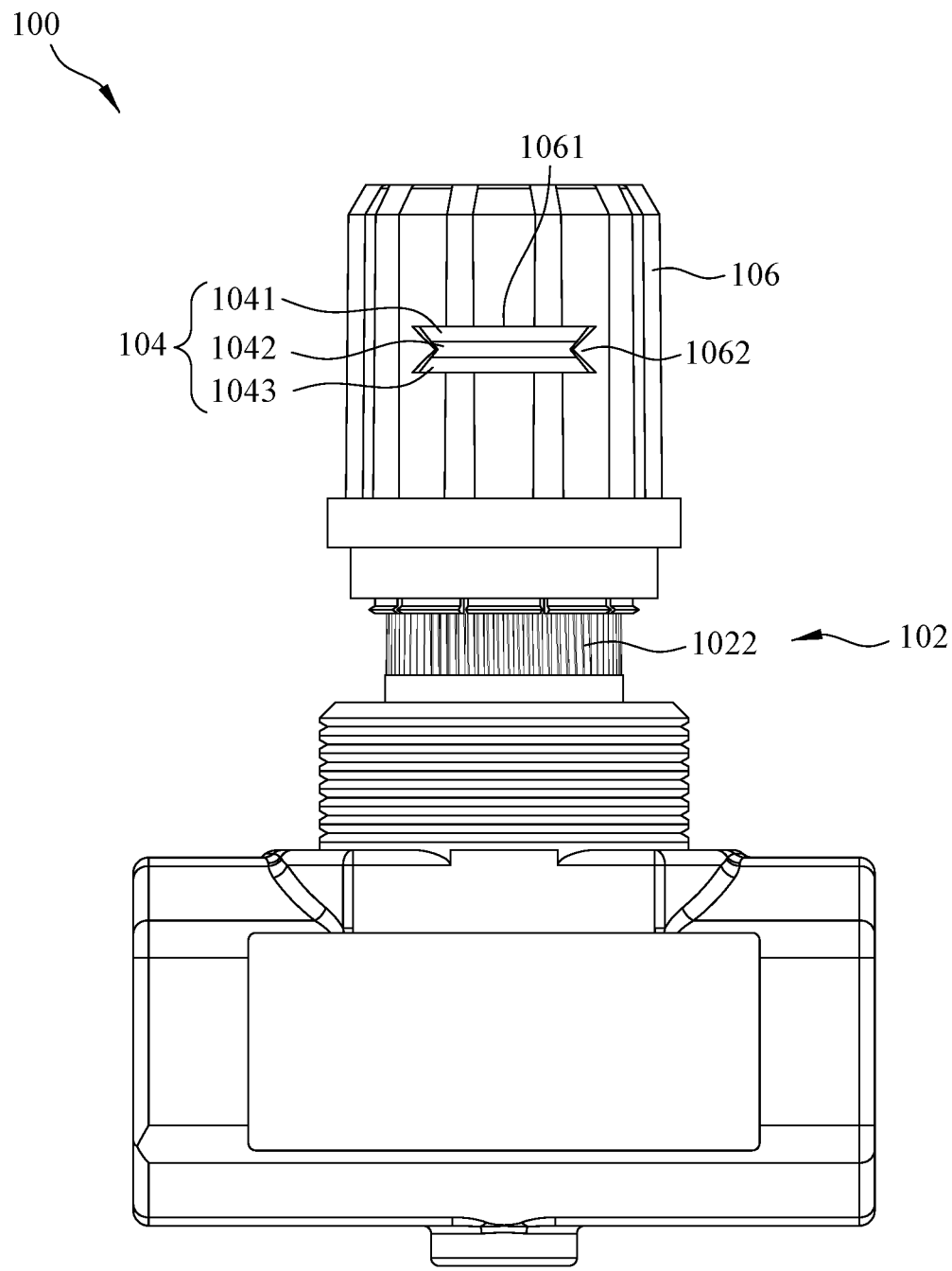
FIG. 11 is a perspective view of a conventional flow control valve.

As shown in FIG. 10, in order to fix the flow rate of the fluid through the flow passage 11 of the valve body 10 at the fourth flow rate, the user can move the positioning ring 70 to the locked position so that the turning knob 60 is fixed to the transparent cap 50 due to relative meshing therebetween and hence cannot be rotated. At this time, the valve rod 30 is prevented from axial movement in the valve seat 20 and the valve body 10.

It is worth mentioning that after assembly of the flow control valve of the present invention, the two smooth sections 54, 55 of the transparent cap 50 are located at the same side with the two external sides 13 and 14 of the valve body 10 respectively in order to facilitate viewing of the flow display device 40 (or the endless display straps 41-45) while two toothed sections 52, 53 of the transparent cap 50 are located at the same side of the opposite ends of the valve body 10 respectively in order to facilitate corresponding meshing between the toothed sections 621 of the turning knob 60 and the two toothed sections 52, 53 of the transparent cap 50 when the circumstance demands, as shown in FIGS. 1 to 4. In general, the first external side 13 of the valve body 10 serves as the front side and the second external side 14 serves as the back side. The two opposite ends 15, 16 of the valve body 10 serve as the left and right sides. Since the two smooth sections 54, 55 of the transparent cap 50 are flatter than the toothed sections 52, 53 of the transparent cap 50, the advantage of the two smooth sections 54, 55 of the transparent cap 50 are located at the same side with the two external sides 13 and 14 of the valve body 10 respectively and thus are easy for the user to clearly see the instant status of the flow display condition directly from the front side of the flow control valve of the present invention. Moreover, since the toothed sections 52, 53 of the transparent cap 50 are responsible for meshing with the toothed section 621 of the resilient tabs 62 of the turning knob 60, the surface thereof is rather rough when compared with the smooth sections 54, 55, but are located at the same sides of the first and second ends 15, 16 of the valve body 10 so as to facilitate viewing of the display straps from the left and right sides of the valve body 10.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A flow control valve comprising:
   a valve body defining a flow passage, having two opposite ends for connecting with a piping system;
   a valve seat including a combining section installed on a top side of said valve body, an insert section and a display section located between said combining and insert sections, said valve seat defining an axial hole in communication with said flow passage of said valve body;

a valve rod disposed rotatably within said axial hole in said valve seat, having a coupling portion extending through said insert section of said valve seat and a blocking portion passing through said combining section of said valve seat to extend into said flow passage of said valve body;

a flow display device installed around said display section of said valve seat, including a plurality of display straps arranged sequentially from top to bottom and each displaying a specific depth of said block portion of said valve rod within said flow passage of said valve body and representing a specific flow rate passing through said flow passage of said valve body, wherein, the higher said display straps represents the smaller extension depth of said blocking portion of said valve rod within said flow passage of said valve body, the larger fluid flow rate through said flow passage in said valve body becomes and wherein, the lower said display straps represents the bigger extension depth of said blocking portion of said valve rod within said flow passage of said valve body, the smaller fluid flow rate through said flow passage in said valve body becomes;

a transparent cap mounted on said insert section of said valve seat in such a manner to enclose said display section of said valve seat and said flow display device;

a turning knob attached to said coupling portion of said valve rod for co-rotating around said valve seat in order to adjust an extension depth of said blocking portion of said valve rod within said flow passage of said valve body, which in turn, simultaneously causes idle rotation of said turning knob relative to said transparent cap and adjusting an enclosing extent of said turning knob relative to said transparent cap such that a portion of said transparent cap is exposed from said turning knob to display entire at least one of said display straps of said flow display device, wherein said at least one of said display straps represents an extension depth of said blocking portion of said valve rod within said flow passage of said valve body and corresponding fluid flow rate through said flow passage in said valve body and wherein the topmost one of said display straps exposed from said transparent cap represents said extension depth of said blocking portion of said valve rod within said flow passage of said valve body and said corresponding fluid flow rate through said flow passage in said valve body; and a positioning ring sleeved around said turning knob and movable between an unlocked position, where said turning knob disengages from said transparent cap such that said turning knob and said valve rod can be rotated arbitrarily relative to said valve seat and causes an axial movement of said valve rod within said axial hole of said valve seat, and a locked position, where said turning knob engages with said transparent cap such that said valve rod is prevented from rotation relative to said valve seat and is prevented from moving axially within said axial hole of said valve seat.

2. The flow control valve according to claim 1, wherein said transparent cap has an external surface including two symmetric toothed sections and another two symmetric smooth sections, a bottom of said turning knob having a plurality of resilient tabs, interior of which are provided with toothed sections while said positioning ring is sleeved around said resilient tabs of said turning knob such that when said positioning ring is moved to said unlocked position, said resilient tabs of said turning knob are not inwardly compressed by said positioning ring relative to said transparent cap, said resilient tabs of said turning knob turn outward so as to disengage said toothed sections of said resilient tabs of said turning knob from said toothed sections of said transparent cap, and when said positioning ring is moved to said locked position, said resilient tabs of said turning knob are compressed inwardly by said positioning ring relative to said transparent cap so as to mesh said toothed sections of some of said resilient tabs of said turning knob with said toothed sections of said transparent cap.

3. The flow control valve according to claim 2, wherein said valve body has two parallel external sides extending in a longitudinal length thereof and two opposite ends transverse to the longitudinal thereof such that after assembly said two symmetric smooth sections of said transparent cap are located at the same side with said parallel external sides of said valve body respectively in order to facilitate viewing of the flow display device while said toothed sections of said transparent cap are located at the same side with said opposite ends of said valve body respectively in order to facilitate meshing with toothed sections of some said resilient tabs of said turning knob.

4. The flow control valve according to claim 1, wherein said valve body further has a mounting seat integrally formed at said top side thereof, said mounting seat having a threaded hole, said combining section of said valve seat having a threaded portion for coupling with said threaded hole in said mounting seat and a seating flange such that said insert section and said display section of said valve seat are located above said seating flange, wherein, said display section of said valve seat defines an outer diameter smaller than an outer diameter of said seating flange while said insert section of said valve seat defines an outer diameter smaller than said outer diameter of said seating flange, but larger than said outer diameter of said display section of said valve seat, said transparent cap being seated on said seating flange and defining an inner diameter equivalent to said outer diameter of said insert section of said valve seat.

5. The flow control valve according to claim 1, wherein said plurality of display straps are provided with colors different from one another.

6. The flow control valve according to claim 1, wherein said turning knob is formed with a mounting hole formed with toothed surface, said transparent cap has a top end formed with a through hole, said coupling portion of said valve rod has an external toothed surface extending through said through hole in said transparent cap for meshing with said toothed surface in said turning knob for co-rotation therewith.

7. A flow control valve comprising:

a valve body defining a flow passage, having two opposite ends for connecting with a piping system;

a valve seat including a combining section installed on a top side of said valve body, an insert section and a display section located between said combining and insert sections, said valve seat defining an axial hole in communication with said flow passage of said valve body;

a valve rod disposed rotatably within said axial hole in said valve seat, having a coupling portion extending through said insert section of said valve seat and a blocking portion passing through said combining section of said valve seat to extend into said flow passage of said valve body;

a flow display device installed around said display section of said valve seat, including a plurality of display straps arranged sequentially from top to bottom and each displaying a specific depth of said block portion of said valve rod within said flow passage of said valve body and representing a specific flow rate passing through said flow passage of said valve body, wherein, the higher said display straps represents the smaller extension depth of said blocking portion of said valve rod within said flow passage of said valve body, the larger fluid flow rate through said flow passage in said valve body becomes and wherein, the lower said display straps represents the bigger extension depth of said blocking portion of said valve rod within said flow passage of said valve body, the smaller fluid flow rate through said flow passage in said valve body becomes;

a transparent cap mounted on said insert section of said valve seat in such a manner to enclose said display section of said valve seat and said flow display device; and a turning knob attached to said coupling portion of said valve rod for co-rotating around said valve seat in order to adjust an extension depth of said blocking portion of said valve rod within said flow passage of said valve body, which in turn, simultaneously causes idle rotation of said turning knob relative to said transparent cap and adjusting an enclosing extent of said turning knob relative to said transparent cap such that a portion of said transparent cap is exposed from said turning knob to display entire at least one of said display straps of said flow display device, wherein said at least one of said display straps represents an extension depth of said blocking portion of said valve rod within said flow passage of said valve body and corresponding fluid flow rate through said flow passage in said valve body and wherein the topmost one of said display straps exposed from said transparent cap represents said extension depth of said blocking portion of said valve rod within said flow passage of said valve body and said corresponding fluid flow rate through said flow passage in said valve body;

wherein said turning knob is formed with a mounting hole formed with toothed surface, said transparent cap has a top end formed with a through hole, said coupling portion of said valve rod has an external toothed surface extending through said through hole in said transparent cap for meshing with said toothed surface in said turning knob for co-rotation therewith.

8. The flow control valve according to claim 7, further comprising a positioning ring sleeved around said turning knob and movable between an unlocked position, where said turning knob disengages from said transparent cap such that said turning knob and said valve rod can be rotated arbitrarily relative to said valve seat and causes an axial movement of said valve rod within said axial hole of said valve seat, and a locked position, where said turning knob engages with said transparent cap such that said valve rod is prevented from rotation relative to said valve seat and is prevented from moving axially within said axial hole of said valve seat.

9. The flow control valve according to claim 8, wherein said transparent cap has an external surface including two symmetric toothed sections and another two symmetric smooth sections, a bottom of said turning knob having a plurality of resilient tabs, interior of which are provided with toothed sections while said positioning ring is sleeved around said resilient tabs of said turning knob such that when said positioning ring is moved to said unlocked position, said resilient tabs of said turning knob are not inwardly compressed by said positioning ring relative to said transparent cap, said resilient tabs of said turning knob turn outward so as to disengage said toothed sections of said resilient tabs of said turning knob from said toothed sections of said transparent cap, and when said positioning ring is moved to said locked position, said resilient tabs of said turning knob are compressed inwardly by said positioning ring relative to said transparent cap so as to mesh said toothed sections of some of said resilient tabs of said turning knob with said toothed sections of said transparent cap.

10. The flow control valve according to claim 9, wherein said valve body has two parallel external sides extending in a longitudinal length thereof and two opposite ends transverse to the longitudinal thereof such that after assembly said two symmetric smooth sections of said transparent cap are located at the same side with said parallel external sides of said valve body respectively in order to facilitate viewing of the flow display device while said toothed sections of said transparent cap are located at the same side with said opposite ends of said valve body respectively in order to facilitate meshing with toothed sections of some said resilient tabs of said turning knob.

11. The flow control valve according to claim 7, wherein said valve body further has a mounting seat integrally formed at said top side thereof, said mounting seat having a threaded hole, said combining section of said valve seat having a threaded portion for coupling with said threaded hole in said mounting seat and a seating flange such that said insert section and said display section of said valve seat are located above said seating flange, wherein, said display section of said valve seat defines an outer diameter smaller than an outer diameter of said seating flange while said insert section of said valve seat defines an outer diameter smaller than said outer diameter of said seating flange, but larger than said outer diameter of said display section of said valve seat, said transparent cap being seated on said seating flange and defining an inner diameter equivalent to said outer diameter of said insert section of said valve seat.

12. The flow control valve according to claim 7, wherein said plurality of display straps is provided with colors different from one another.

* * * * *